United States Patent
Maier et al.

(10) Patent No.: US 8,781,698 B2
(45) Date of Patent: Jul. 15, 2014

(54) METHOD FOR CONTROLLING THE SHIFTING OF AN AUTOMATIC GEARED TRANSMISSION

(75) Inventors: Alexander Maier, Friedrichshafen (DE); Maik Wuerthner, Markdorf (DE); Joachim Staudinger, Memmingen (DE); Johannes Kemler, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/822,696

(22) PCT Filed: Aug. 3, 2011

(86) PCT No.: PCT/EP2011/063346
§ 371 (c)(1),
(2), (4) Date: Mar. 13, 2013

(87) PCT Pub. No.: WO2012/038138
PCT Pub. Date: Mar. 29, 2012

(65) Prior Publication Data
US 2013/0211681 A1    Aug. 15, 2013

(30) Foreign Application Priority Data
Sep. 24, 2010  (DE) .......... 10 2010 041 325

(51) Int. Cl.
*G06F 7/00*      (2006.01)
*G06F 17/00*     (2006.01)
*G06F 19/00*     (2011.01)
*F16H 61/02*     (2006.01)
*B60W 40/072*    (2012.01)
*F16H 59/66*     (2006.01)
*B60W 40/076*    (2012.01)
*F16H 59/14*     (2006.01)

(52) U.S. Cl.
CPC .......... *F16H 59/66* (2013.01); *F16H 2061/022* (2013.01); *B60W 40/072* (2013.01); *F16H 2059/666* (2013.01); *F16H 61/0213* (2013.01); *B60W 40/076* (2013.01); *F16H 2059/142* (2013.01)
USPC .......................................................... 701/65

(58) Field of Classification Search
CPC ............................. F16H 59/66; F16H 61/0213
USPC ...................................................... 701/65, 58
See application file for complete search history.

(56) References Cited

U.S. PATENT DOCUMENTS

| | | |
|---|---|---|
| 5,832,400 A | 11/1998 | Takahashi et al. |
| 8,229,634 B2 | 7/2012 | Winkel |

FOREIGN PATENT DOCUMENTS

| | | |
|---|---|---|
| DE | 10 129 149 A1 | 1/2002 |
| DE | 10 2004 030 149 A1 | 1/2006 |
| DE | 10 2004 040 351 A1 | 3/2006 |
| DE | 10 2005 050 753 A1 | 4/2007 |
| DE | 10 2006 001 818 A1 | 7/2007 |
| DE | 10 2007 044 432 A1 | 3/2009 |
| DE | 10 2008 023 135 A1 | 11/2009 |
| WO | 2005/124193 A1 | 12/2005 |
| WO | 2007/045332 A1 | 4/2007 |

OTHER PUBLICATIONS

International Search Report for corresponding PCT application.
German Search Report for corresponding German application.
Written Opinion for corresponding PCT application.

*Primary Examiner* — Maceeh Anwari
(74) *Attorney, Agent, or Firm* — Davis & Bujold, PLLC; Michael J. Bujold

(57) ABSTRACT

A method for controlling shifts in an automated multi-step variable-speed transmission, in a drive-train of a motor vehicle, between a drive engine in the form of an internal combustion engine and an axle drive. During driving, besides current vehicle, road and driver-specific operating parameters, topographical data relating to a road section ahead of the motor vehicle, in particular the road section height profile, are determined, and from this information, the driving resistance profile (FFW(xF)) of the motor vehicle for the road section ahead is determined. In the automatic mode of the multi-step variable-speed transmission, control commands for traction upshifts and/or traction downshifts are derived, during the traction operation, as a function of the driving resistance profile (FFW(xF)) and are implemented in the transmission. A limiting gear progression (GGr(xF)) is determined, which consists of the sequence of gears, and is evaluated for the derivation of control commands.

20 Claims, 6 Drawing Sheets

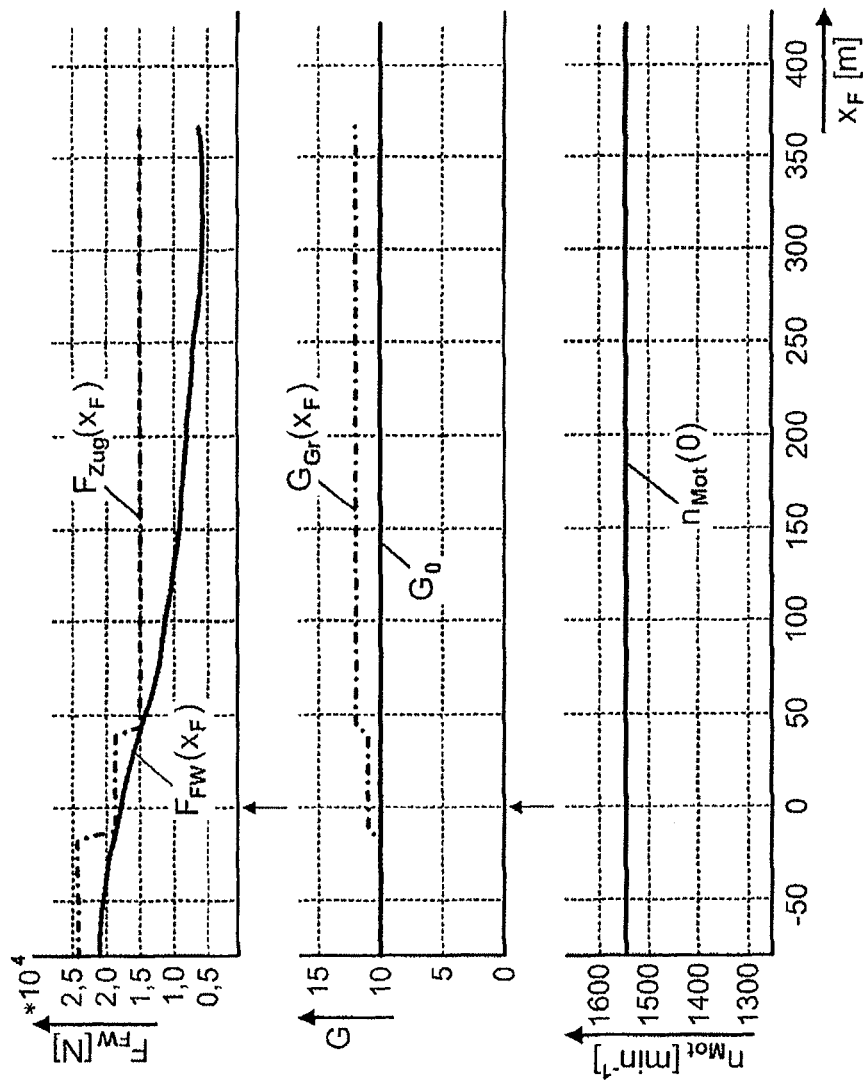

Figures 5A, 5B, 5C:
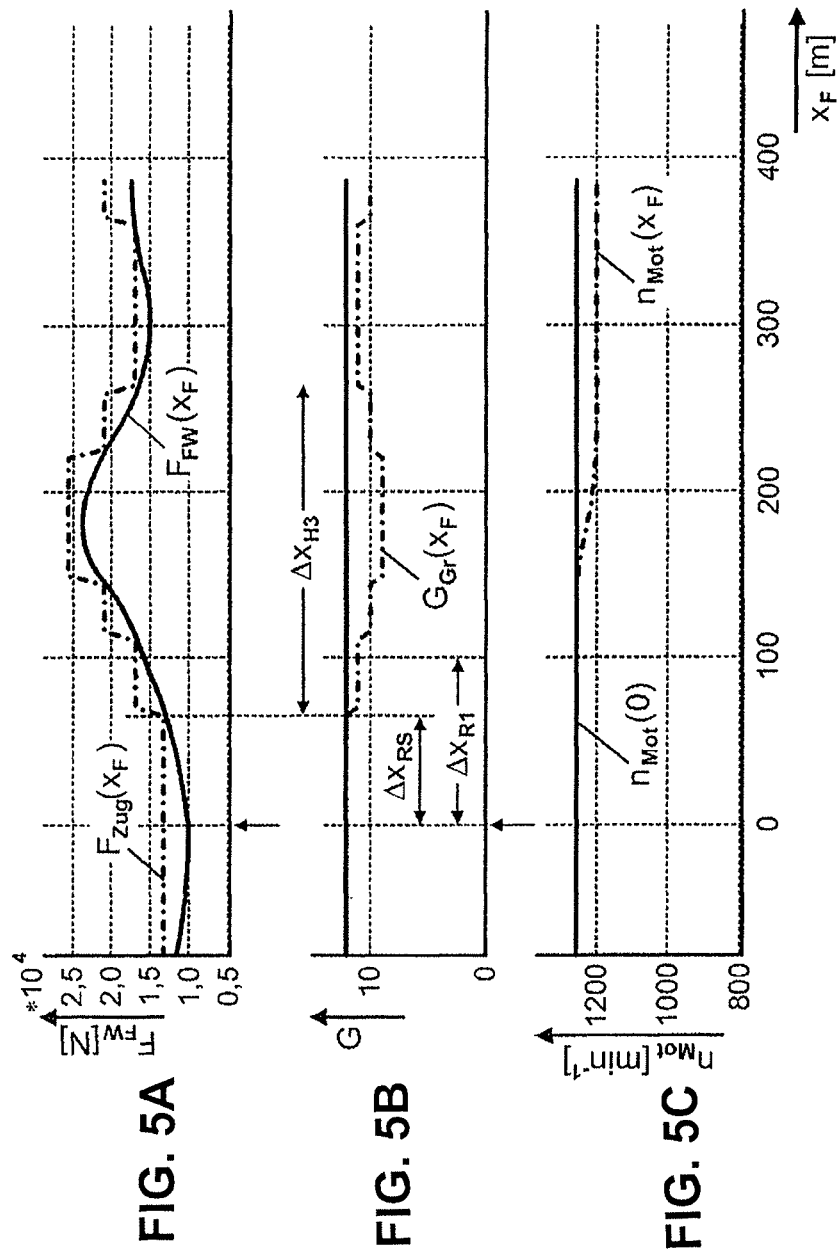

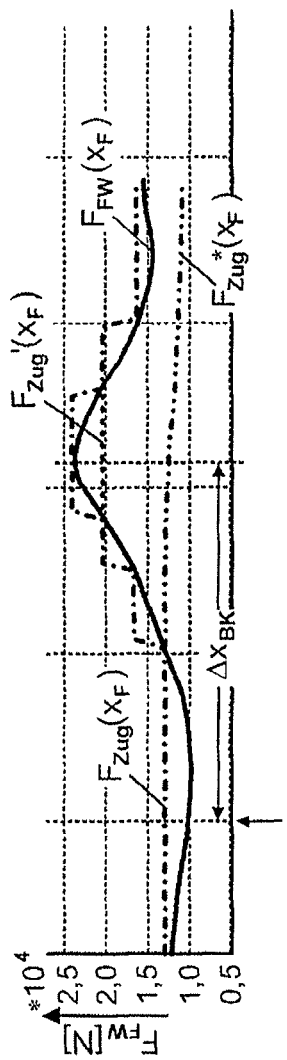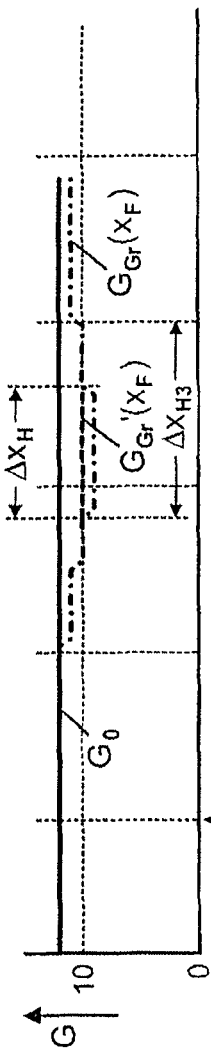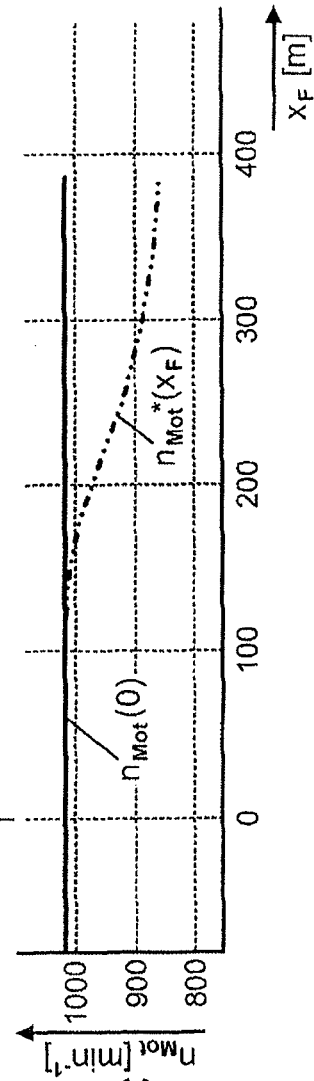
FIG. 6A
FIG. 6B
FIG. 5C

METHOD FOR CONTROLLING THE SHIFTING OF AN AUTOMATIC GEARED TRANSMISSION

This application is a national stage completion of PCT/EP2011/063346 filed Aug. 3, 2011 which claims priority from German Application Serial No. 10 2010 041 325.9 filed Sep. 24, 2010

FIELD OF THE INVENTION

The invention concerns a method for controlling shifts in an automatic geared transmission arranged in a drive-train between a drive motor in the form of an internal combustion engine and an axle drive, such that during driving, besides current vehicle, road and driver-specific operating parameters, topographical data pertaining to a road section ahead of the motor vehicle, in particular the height profile, are determined, from these the driving resistance profile of the motor vehicle for the road section ahead is determined, and in the automatic mode of the multi-step variable-speed transmission, during traction operation control commands for traction upshifts and/or traction downshifts are derived and implemented as a function of the driving resistance profile.

BACKGROUND OF THE INVENTION

Modern multi-step variable-speed transmissions such as automated variable-speed transmissions, planetary automatic transmissions and dual-clutch transmissions can be operated both in a manual mode and in an automatic mode. In the manual mode shifts can be initiated directly by the driver, for example when the driver uses his hand to move a shift lever provided for the purpose in an upshift direction or in a downshift direction. In contrast, in the automatic mode shifts are initiated automatically, in that current vehicle, road and driver-specific operating parameters, such as the current driving speed, the current driving acceleration, the current engine speed, the current engine torque, the current vehicle mass, the current road inclination (uphill, level, downhill), the current driving resistance and the current driver's wish (a power demand by the driver or by a cruise control), are determined and shifts are initiated with reference to shift performance graphs or shift characteristic curves. The current operating parameters can either be measured directly or calculated from measured values. For example, the current driver's wish can be deduced by means of an associated characteristic curve, from the position of the accelerator pedal, which can be measured by a potentiometer. In improved processes, the calculable rate of change of the accelerator pedal's position can additionally be used for this.

It is true that in most operating situations, shift control of automated variable-speed transmissions that is based on current operating parameters gives good results, so far as high driving dynamics, low fuel consumption and a high level of shifting and driving comfort are concerned. However, particularly in the transition zone between different road inclinations and driving resistances, inappropriate shifts often occur because conventional shift control methods do not take into account the topography of the road section ahead of the motor vehicle. For example, before reaching the brow of a hill a downshift may be initiated although the vehicle could drive over the brow of a hill with little loss of speed even in the currently engaged gear, so that the downshift and a subsequent upshift could have been avoided.

Likewise, when an uphill stretch is known to be approaching it is advantageous to shift down to a lower gear even before beginning to drive up the slope, since the vehicle can then drive up at a higher speed and a further downshift can perhaps be avoided. Moreover, when moving from a downhill stretch onto level ground it is expedient, even before reaching the level stretch, to upshift to a higher gear since by doing this, using the kinetic energy of the motor vehicle it can be driven onto the level stretch at a higher speed so that transition to traction operation takes place later.

Thus, to improve the shifting behavior of automated multi-step variable-speed transmissions some methods and devices have already been proposed, which provide for the detection of topographical data regarding a road section ahead of the motor vehicle, in particular its height profile, and for taking this into account for controlling shifts in an automated transmission.

For example, DE 101 29 149 A1 proposes a method for optimizing the force transmission from an engine to the drive wheels of a vehicle, in which method road and map data from a navigation system are also used when specifying nominal values for controlling the engine and/or the transmission. This known method provides that from the road and map data of the navigation system information is determined concerning the road section ahead, such as road inclination, road curvature (curve radius) and other attributes of the road and its surroundings, and from that information control commands for controlling the transmission and/or the engine are derived.

DE 10 2006 001 818 A1 describes a method and device for assisting the driver during the driving operation of a motor vehicle, in which the topographical data relating to a road section of the drive route ahead of the motor vehicle are called up from a memory and evaluated by the transmission control system, with computer support, when adjusting driving operation components, in particular when setting a gear in the transmission. The topographical data can be stored in the form of a height profile or an inclination profile of the drive route concerned.

Finally, from DE 10 2005 050 753 A1 a method and device for controlling and/or regulating an automatic system of a motor vehicle is known, in which, to determine the nature of a road stretch ahead of the motor vehicle, data are collected and combined to form a driving resistance profile of the motor vehicle. The driving resistance profile determined is intended, among other things, to be used in an automatic transmission for producing the transmission gear ratio most suitable for the stretch ahead of the motor vehicle.

It is true that the known methods and devices provide useful approaches for improving the shifting behavior of automated multi-step variable-speed transmissions. However, the documents cited do not provide concrete indications about how, from the topographical data relating to the road section ahead of the motor vehicle, such as its height profile, its inclination profile or the vehicle's driving resistance profile, specific control commands should be derived and implemented in the transmission control system.

SUMMARY OF THE INVENTION

Against this background the purpose of the present invention is to indicate a method for controlling shifts in an automated multi-step variable-speed transmission, of the type mentioned at the start, with which, in the automatic mode during traction operation, concrete control commands for traction upshifts and/or traction downshifts can be derived from the driving resistance profile for the motor vehicle and for the road section ahead, and can be implemented with the least possible control effort.

This objective is achieved in that, from the driving resistance profile for the road section ahead and from operating parameters of the drive engine and the transmission, such as the torque and the consumption map of the engine and the gear ratios of the transmission, a limiting gear progression is determined which consists of the sequence of the highest respective gears in which the traction force of the engine acting on the drive wheels of the motor vehicle is in each case larger than the driving resistance, and the limiting gear progression is evaluated to enable the derivation of control commands for a traction upshift and/or a traction downshift.

Accordingly, the invention starts with an automated multi-step variable-speed transmission known per se, arranged in a drive-train between a drive engine in the form of an internal combustion engine and an axle drive. During driving, in addition to current vehicle, road and driver-specific operating parameters, topographical data relating to a road stretch ahead of the motor vehicle, above all the height profile concerned, are also determined continually (i.e. in a defined time cycle or at determined driving distances). From the resulting inclination profile and with knowledge of the vehicle's mass, the air resistance coefficient and the rolling resistance coefficient of the vehicle, for each point along the travel path the driving resistance can be determined, in accordance with the known driving resistance equation $F_{FW}=F_{Luft}+F_{Roll}+F_{Steig}$, as the sum of the air resistance $F_{Luft}$, the rolling resistance $F_{Roll}$ and the resistance $F_{Steig}$ due to road inclination, and thus the driving resistance profile $F_{FW}(x_F)$ as a whole of the motor vehicle for the road section ahead can be determined.

When the multi-step variable-speed transmission is operated in the automatic mode and the motor vehicle is operating in traction, control commands for traction upshifts and/or traction downshifts are derived as a function of the driving resistance profile $F_{FW}(x_F)$ and used, among other things, for the control of shift actuators. In a general form this procedure is known, for example, from DE 10 2005 050 753 A1.

The method according to the invention now includes the derivation of concrete control commands for traction upshifts and/or traction downshifts as a function of the driving resistance profile $F_{FW}(x_F)$, and their implementation within the transmission control system of an automated multi-step variable-speed transmission. For this, from the driving resistance profile $F_{FW}(x_F)$ for the road section ahead and from operating parameters of the drive engine and the multi-step variable-speed transmission a limiting gear progression $G_{Gr}(x_F)$ is determined, which consists of the sequence of the highest respective gears in which the traction force of the engine acting on the drive wheels of the motor vehicle is in each case larger than the driving resistance $F_{FW}(x_F)$.

The limiting gear progression $G_{Gr}(x_F)$ is then evaluated for the derivation of control commands for a traction upshift and/or a traction downshift. This means that with reference to the shifts and the dwell time in the gears of the limiting gear progression $G_{Gr}(x_F)$ so determined, it is decided whether as a deviation from or as a supplement to the normal shift control a traction upshift and/or traction downshift should basically be allowed, blocked or at least delayed, or initiated prematurely. On that basis, in a simple manner clear decision criteria for the initiation or non-initiation of traction shifts can be derived.

To determine the limiting gear progression $G_{Gr}(x_F)$, first of all the variation of the driving resistance gear ratio $i_{FW}(x_F)$ for the road section ahead, in which the traction force of the drive engine acting on the drive wheels of the motor vehicle corresponds in each case to the driving resistance $F_{FW}(x_F)$, is calculated from the driving resistance profile $F_{FW}(x_F)$ using the equation: $i_{FW}(x_F)=F_{FW}(x_F)/(M_{Mot}*i_{TA}/r_{RA}*h_{TS})$ in which $x_F$ is the driving distance variable, $M_{Mot}$ is the engine torque, $i_{TA}$ is the gear ratio of the drive axle, $r_{RA}$ is the radius of the drive wheels and $h_{TS}$ is the efficiency of the drive-train. From this the gears of the limiting gear progression $G_{Gr}(x_F)$ are then determined, as the highest gears whose gear ratio $i_{G\_Gr}$ in each case is larger than the driving resistance gear ratio $i_{FW}(x_F)$, (i.e. $i_{G\_Gr}>i_{FW}(x_F)$). This automatically gives the shift points at which, within the limiting gear progression $G_{Gr}(x_F)$, a traction upshift or a traction downshift is appropriate.

The control commands for a traction upshift and/or a traction downshift are advantageously communicated to a shift control system of the transmission control system of the multi-step variable-speed transmission in each case by replacing at least one control-relevant value of a current operating parameter with a suitably determined or modified value. In that way only at least one input parameter of the normal shift control system is changed. The normal shift control system can thus be kept unchanged, so that switching over between a plurality of control programs and/or shifting characteristic curves is avoided.

The current driver's wish (power demand by the driver or a tempomat) and the current driving resistance $F_{FW}(0)$ can be regarded as operating parameters suitable for this purpose, so that to influence the shifting behavior of the multi-step variable-speed transmission correspondingly, the value of the current driver's wish and/or the value of the current driving resistance $F_{FW}(0)$ is/are replaced, respectively, by a suitably determined or modified value.

The method according to the invention provides that basically a traction upshift is allowed if the limiting gear of the limiting gear progression, at the current position of the vehicle, is higher than the gear currently engaged, and this limiting gear in the limiting gear progression will subsequently not be downshifted within a specified limiting driving time or limiting drive distance.

In contrast, to avoid a marked speed reduction and traction force break and if necessary to enable a traction downshift as early as possible, a traction downshift is allowed when the limiting gear of the limiting gear progression at the current position of the vehicle corresponds to the gear currently engaged, the limiting gear progression subsequently provides for a traction downshift into a lower gear within a specified limiting driving time or limiting drive distance, and this limiting gear in the limiting gear progression will not subsequently be exceeded within a specified limiting driving time or limiting driving distance.

In this case, to allow a traction upshift and/or a traction downshift the control-relevant values of the current operating parameters are kept unchanged, i.e. the corresponding shift is initiated by the normal shift control system in that the shifting speed of the shifting characteristic curve concerned is reached or exceeded or fallen below. Accordingly, the shifting behavior is only influenced when, by virtue of the limiting gear progression, the blocking or delay or premature initiation of a traction upshift or a traction downshift is seen to be advantageous.

Thus, provision is made to block or delay a traction upshift if the limiting gear of the limiting gear progression in the current position of the vehicle is higher than the currently engaged gear, but there will be a downshift again, to below this limiting gear of the limiting gear progression, within the specified driving time limit or driving distance limit. In that case the driving resistance is only reduced during a short driving time or driving distance, so that the road section concerned can be traversed still in the currently engaged gear without much speed loss and the upshift concerned and a subsequent downshift can be avoided.

Expediently, the traction upshift concerned is blocked or delayed by replacing the value of the current driver's wish by the full-load value, i.e. 100%, and replacing the value of the current driving resistance by the value of the driving resistance at a travel point ahead of the motor vehicle or by its value averaged over a road section ahead of the motor vehicle, in which the limiting gear of the limiting gear progression corresponds to the currently engaged gear.

On the other hand according to the invention a traction upshift is preferably initiated prematurely, i.e. before the shifting speed concerned has been reached or exceeded, or even before the shifting process within the limiting gear progression, if the limiting gear of the limiting gear progression in the current position of the vehicle is at least two steps higher than the currently engaged gear and there will not be a downshift to a gear lower than this limiting gear in the limiting gear progression over the whole of the road section ahead, for example of 400 m, for which the driving resistance profile is determined. By a premature traction upshift while the driving resistance is decreasing, a high engine speed is avoided and the fuel consumption and noise emission of the drive engine are thereby reduced.

Alternatively, however, it can also be provided that a traction upshift is initiated prematurely if the limiting gear of the limiting gear progression at the current position of the vehicle is at least one step higher than the currently engaged gear and there will be no downshift to a gear lower than this limiting gear in the limiting gear progression within a specified driving time limit or driving distance limit. The driving time limit or driving distance limit can be identical to the driving time limit or driving distance limit for allowing a traction upshift, or identical to the whole of the road section ahead or the driving time needed for covering it, or it may be different from these.

Expediently, the traction upshift concerned is initiated prematurely by replacing the value of the current driver's wish by a part-load value, for example 45%, and the value of the current driving resistance by the value of the driving resistance at a travel point ahead of the motor vehicle, or by a value of the driving resistance averaged over a road section ahead of the motor vehicle, in which, relative to the currently engaged gear, the limiting gear of the limiting gear progression is higher by two steps or by one step, respectively.

Since during accelerator pedal operation a premature traction upshift is preferably initiated by the driver, for example by pressing the accelerator pedal farther in the full-gas direction, it can be provided that an automated premature initiation of a traction upshift is only initiated during tempomat operation and is only allowed if the nominal speed concerned has already previously been reached and the speed is currently below it.

For a premature initiation and for blocking or delaying a traction downshift, the method according to the invention provides that in addition, at least the variation of the engine speed of the drive engine in the currently engaged gear, starting from the current engine speed, is predicted and evaluated with reference to the driving resistance variation.

Accordingly, it is provided that a traction downshift is blocked or delayed if the limiting gear of the limiting gear progression in the current position of the vehicle corresponds to the currently engaged gear, the limiting gear progression provides for a forthcoming traction downshift to a lower limiting gear within the specified driving time or driving distance limit, but within the specified driving time or driving distance limit a shift to a gear higher than this limiting gear in the limiting gear progression will take place again, and/or if, within the specified driving time or driving distance limit, the predicted engine speed variation does not fall below a specified lower speed limit, and/or if, within the specified driving time or distance limit, a predicted reduction of the engine speed to a current engine speed reduction is smaller than a specifiable limit value. This operating situation preferably occurs before driving over the brow of a hill which, if necessary, can be driven over in the currently engaged gear without much loss of speed, whereby the traction downshift concerned and a subsequent upshift can be avoided.

Expediently, a traction downshift can be blocked or delayed by replacing the value of the current driver's wish by a reduced value, such as 80%, and the value of the current driving resistance by the driving resistance value at a travel point ahead of the vehicle or by a driving resistance value averaged over a road section ahead of the motor vehicle, in which the limiting gear of the limiting gear progression corresponds to the currently engaged gear and/or to a higher gear.

According to the invention, a traction downshift is initiated prematurely, i.e. before the speed reaches or falls below the shifting speed or even before the shifting process concerned within the limiting gear progression, if the limiting gear of the limiting gear progression at the current position of the vehicle corresponds to the currently engaged gear, the limiting gear progression provides for a forthcoming traction downshift to a lower limiting gear within a specified driving time limit or driving distance limit and, within a specified driving time or driving distance limit, no shift will take place to a gear higher than this limiting gear in the limiting gear progression, and/or if, within the specified driving time or driving distance limit, the predicted variation of the engine speed falls below the specified lower speed limit, and/or if, within the specified driving time or distance limit, a predicted speed reduction of the engine speed to a current engine speed reduction is larger than a specified limit value. This operating situation occurs in particular before beginning to drive up a longer slope or a steeper road section, so that by virtue of the premature traction downshift a higher driving speed is achieved on the slope and further downshifts can be avoided. The driving time or distance limits specified in this case can be identical to the driving time or driving distance limits for allowing a traction downshift, or they may be defined differently therefrom.

Expediently, the traction downshift concerned, is initiated prematurely by replacing the value of the current driver's wish by the full-load value, i.e. 100%, and the value of the current driving resistance by the driving resistance value at a travel point ahead of the motor vehicle or by the driving resistance value averaged over a road section ahead of the motor vehicle, in which the limiting gear of the limiting gear progression is lower than the currently engaged gear.

For the premature initiation of a traction downshift the times or distances until the downshift can be determined within the limiting gear progression, and unless the traction downshift should be initiated immediately it can be initiated after the lapse of a specified proportion of the time or distance, for example after 70% thereof.

Moreover it can be provided that a traction downshift is initiated before the lapse of the specified proportion of the time or distance if, by then, the engine speed of the drive engine reaches or falls below a specified lower speed limit. Thus the traction downshift is initiated by the first of these events to occur, i.e. either by the lapse of the specified proportion of the time or distance, or when the speed of the drive engine reaches or falls below the lower speed limit.

BRIEF DESCRIPTION OF THE EMBODIMENTS

Figures 2A, 2B, 2C:
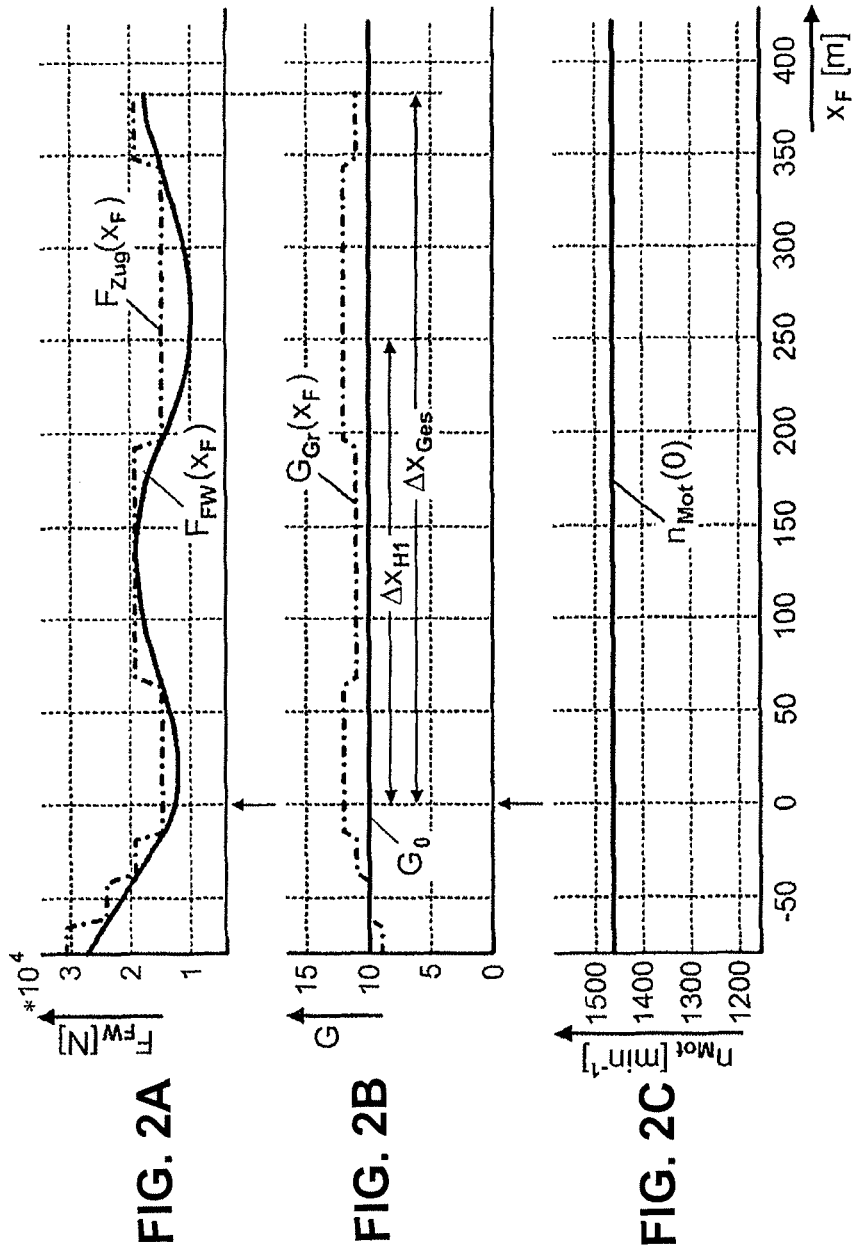
Figure 3A:
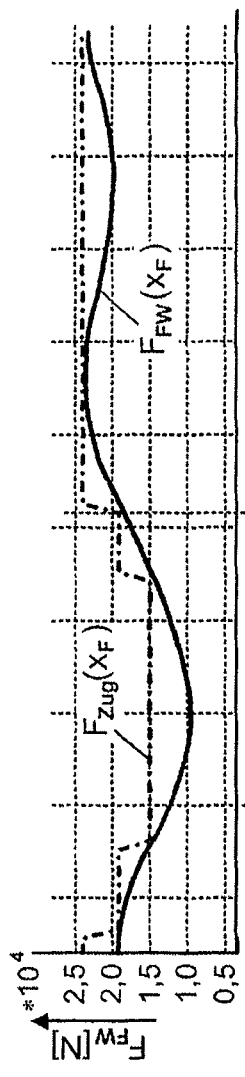
Figure 3B:
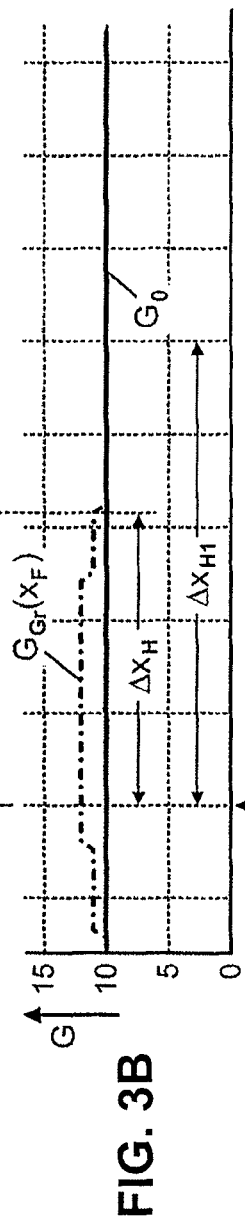
Figure 3C:
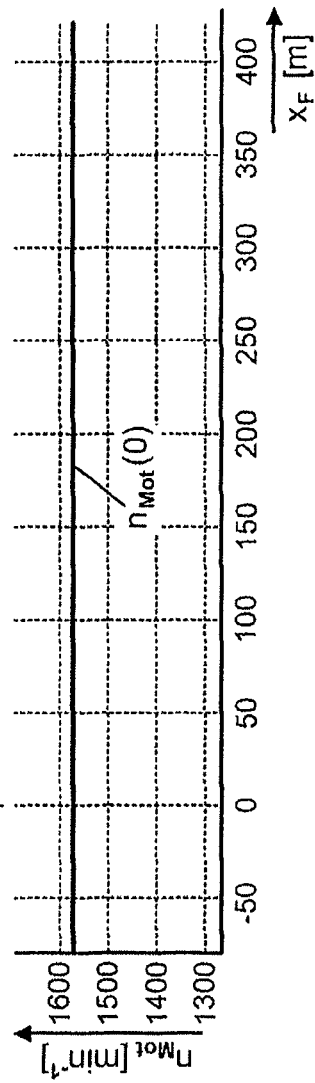
Figures 4A, 4B, 4C:
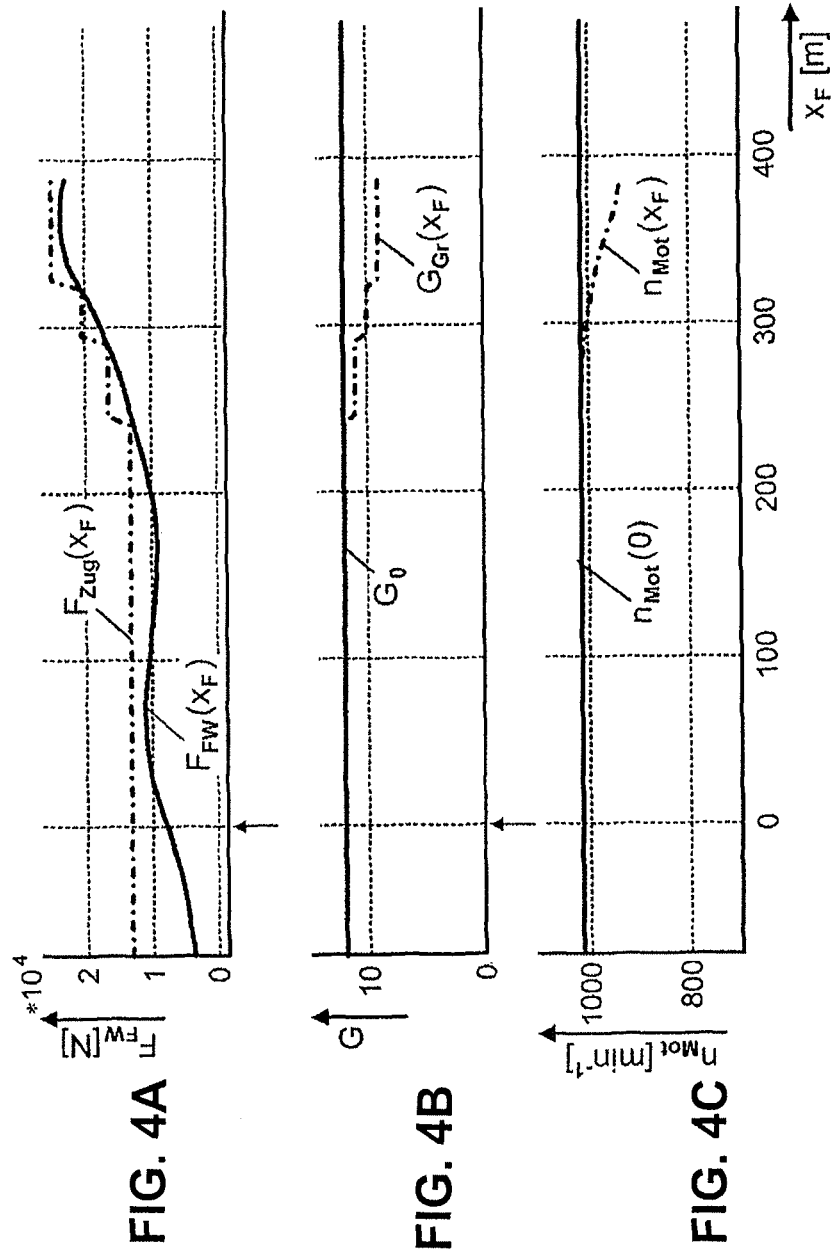

To clarify the invention the description of a drawing with example embodiments is attached. The drawings show:

FIGS. 1A, 1B 1C diagrams respectively, with a driving resistance variation and a traction force variation, a limiting gear progression and an engine speed variation, in each case plotted against driving resistance, to explain how the limiting gear progression is determined when the driving resistance is decreasing, FIGS. 2A, 2B, 2C diagrams respectively, with a driving resistance variation and a traction force variation, a limiting gear progression and an engine speed variation, in each case plotted against driving resistance, to explain how a traction upshift is allowed, FIGS. 3A, 3B, 3C diagrams respectively, with a driving resistance variation and a traction force variation, a limiting gear progression and an engine speed variation, in each case plotted against driving resistance, to explain the blocking of a traction upshift, FIGS. 4A, 4B, 4C diagrams respectively, with a driving resistance variation and a traction force variation, a limiting gear progression and an engine speed variation, in each case plotted against driving resistance, to explain how the limiting gear progression is determined when the driving resistance is increasing, FIGS. 5A, 5B, 5C diagrams respectively, with a driving resistance variation and a traction force variation, a limiting gear progression and an engine speed variation, in each case plotted against driving resistance, to explain the premature initiation of a traction downshift, and FIGS. 6A, 6B, 6C diagrams respectively, with a driving resistance variation and a traction force variation, a limiting gear progression and an engine speed variation, in each case plotted against driving resistance, to explain the blocking of a traction downshift.

DETAILED DESCRIPTION OF THE EMBODIMENTS

Part a) of FIG. 1 shows the driving resistance profile $F_{FW}(x_F)$ of a motor vehicle, determined from topographical data, in particular the height profile, of a road section ahead of the motor vehicle concerned, plotted against the driving distance $x_F$, wherein the current position of the vehicle corresponds to the travel point $x_F=0$. The motor vehicle is a heavy motor vehicle with a vehicle mass of $m_{Fzg}=40,000$ kg. Part b) of FIG. 1 indicates the gear currently engaged as $G_0=10$. Part c) of FIG. 1 shows the current engine speed of the drive engine, namely $n_{Mot}(0)=1540$ min$^{-1}$.

Now, for the road section ahead, from the driving resistance profile $F_{FW}(x_F)$, a limiting gear progression $G_{Gr}(x_F)$ shown in part b) of FIG. 1 was determined as the sequence of the highest respective gears in which the traction force $F_{Zug}$ acting on the drive wheels of the motor vehicle is in each case larger than the driving resistance $F_{FW}$. Thus, the traction force variation $F_{Zug}=f(x_F)$ represents the largest possible traction force in the limiting gear concerned at a specific engine speed $n_{Mot}$. In this case, for the sake of simplicity, the limiting gear progression was calculated with the torque $M_{Mot}$ of the drive engine assuming a constant current engine speed $n_{Mot}(0)$. To make this more clear the corresponding traction force variation $F_{Zug}(x_F)$ is also shown in part a) of FIG. 1.

In the present case the motor vehicle is currently ($x_F=0$) at a position where the driving resistance is about $F_{FW}=18$ kN, which with the vehicle mass of $m_{Fzg}=40,000$ kg corresponds to a road inclination of about 4% and a driving speed of about $v_F=60$ km/h. Farther along the driving stretch ($x_F>0$) the slope becomes flatter so that the driving resistance $F_{FW}$ decreases and the limiting gear progression $G_{Gr}(x_F)$ indicates two possible traction upshifts, to gear 11 and gear 12. Currently a traction upshift to the eleventh gear would be possible, since at $x_F=0$ this is already within the limiting gear progression $G_{Gr}(x_F)$.

In the diagrams a) to c) of FIG. 2 constructed analogously to FIG. 1, an example of a driving situation is illustrated, in which a traction upshift can be allowed. The driving resistance $F_{FW}(x_F)$ shown in part a) of FIG. 2 is currently decreasing (at $x_F=0$) and, except for a brief rise in the road section ahead between $x_F=70$ m and $x_F=180$ m, it remains at a low level. The limiting gear progression $G_{Gr}(x_F)$ shown in part b) of FIG. 2 currently (at $x_F=0$) indicates a gear two gear steps higher than the currently engaged gear $G_0=10$. Furthermore, it can be seen from the continuation of the limiting gear progression $G_{Gr}(x_F)$ that the gear next-higher than the currently engaged gear $G_0$ could remain engaged up to the end of the driving stretch ahead of the motor vehicle, of about $Dx_{Ges}=380$ m.

To allow a traction upshift, it is provided in the method according to the invention that for this, the limiting gear $G_{Gr}(0)$ of the limiting gear progression $G_{Gr}(x_F)$ at the current position ($x_F=0$) must be higher than the currently engaged gear $G_0$ ($G_{Gr}(0)>G_0$) and, within a specified driving distance limit $Dx_{H1}$, the engaged gear must not be lower than the limiting gear $G_{Gr}(0)$ in the limiting gear progression $G_{Gr}(x_F)$. For example, if the driving distance limit is set as $Dx_{H1}=250$ m, in this case both conditions are fulfilled so in the present case the traction upshift to the next-higher gear $G=11$ is allowed. The traction upshift is initiated without further measures by the normal shift control system when the corresponding shifting speed is reached or exceeded.

In contrast, according to diagrams a) to c) of FIG. 3 the motor vehicle is in a driving situation in which, although the limiting gear progression $G_{Gr}(x_F)$ shown in part b) of FIG. 3 currently (at $x_F=0$) indicates a limiting gear two gear steps higher than the currently engaged gear ($G_0=10$) (i.e. $Gr(0)=G_0+2=12$), even the next-higher gear ($G=11$) can only be maintained over a road section of about $Dx_H=160$ m before the traction force $F_{Zug}$ of the drive engine in that gear ($G=11$) would decrease to below the driving resistance $F_{FW}$. However, since this road section is shorter than the driving distance limit of $Dx_{H1}=250$ m set in this case, in the present instance the traction upshift to the next-higher gear $G=11$ is blocked.

The traction upshift is blocked by replacing two control-relevant input values of the normal shift control system by suitably determined or modified values. Specifically, for this the value of the current driver's wish is replaced by the full-load value (100%) and the value of the current driving resistance $F_{FW}(0)$ is replaced by the value of the driving resistance at a travel point ahead of the motor vehicle or by the driving resistance value averaged over a road section ahead of the motor vehicle, in which the limiting gear $G_{Gr}$ of the limiting gear progression $G_{Gr}(x_F)$ corresponds to the currently engaged gear $G_0$ ($G_{Gr}=G_0$).

Analogously to FIG. 1, part a) of FIG. 4 shows the driving resistance profile $F_{FW}(x_F)$ of the motor vehicle concerned over the driving stretch $x_F$, determined from topographical data, in particular the height profile, of a road section ahead of the motor vehicle. In this case the motor vehicle is located a short way before an uphill slope which at first amounts to about 2% and then progressively increases to about 7%. At the time ($x_F=0$) the twelfth gear ($G_0=12$) is engaged. Thus, in the currently engaged gear $G_0$, from about 240 m ahead of the motor vehicle the traction force $F_{Zug}$ of the drive engine will no longer be sufficient to compensate the driving resistance $F_{FW}$ of the motor vehicle.

Consequently, from that travel point ($x_F$=240 m) onward the limiting gear progression $G_{Gr}(x_F)$ determined from the driving resistance profile $F_{FW}(x_F)$ and pictured in part b) of FIG. 4 provides for a number of traction downshifts. The corresponding traction force variation $F_{Zug}(x_F)$ is also indicated in part a) of FIG. 4. However, to avoid a decrease of the engine speed $n_{Mot}(x_F)$ pictured in part c) of FIG. 4 and a corresponding speed loss, in this case premature initiation of a traction downshift would be advantageous, since then the vehicle would drive up the steeper section of the slope with a higher engine speed and a correspondingly larger traction force. In this way at least one of the traction downshifts provided for in the limiting gear progression $G_{Gr}(x_F)$ could be avoided.

In the diagrams of FIG. 5 composed analogously to FIG. 4 an example of a driving situation is illustrated, in which a traction downshift is permitted and initiated prematurely. By virtue of the brow of a hill about 70 m ahead of the motor vehicle the driving resistance $F_{FW}(x_F)$ pictured in part a) of FIG. 5 increases relatively markedly, then falls again somewhat from travel point $x_F$=180 m and then, for the remainder of the road section recorded, remains at a level higher than the current driving resistance $F_{FW}(0)$. Consequently, after a travel path of $Dx_{RS}$=70 m, the limiting gear progression $G_{Gr}(x_F)$ shown in part b) of FIG. 5 and the traction force variation $F_{Zug}(x_F)$ also shown in part a) of FIG. 5 provide for a first traction downshift from the currently engaged, twelfth gear ($G_0$=12) to the next-lower, eleventh gear. Moreover, from the limiting gear progression $G_{Gr}(x_F)$ it can be seen that the gear ($G_{Gr}$=11) is no longer changed upward by the end of the road section of about $Dx_{Ges}$=380 m recorded ahead of the motor vehicle.

Consequently, the traction downshift concerned is permitted provided that the travel stretch $Dx_{RS}$ until the downshift envisaged is shorter than a specified travel distance limit $Dx_{R1}$ ($Dx_{RS}<Dx_{R1}$), and this limiting gear ($G_{Gr}$=11) of the limiting gear progression $G_{Gr}(x_F)$ is not subsequently exceeded within a specified driving distance limit $Dx_{H3}$. In the present case, for example, a travel distance limit of $Dx_{R1}$=100 m and a driving distance limit of $Dx_{H3}$=200 m are assumed, so both conditions are fulfilled and the traction downshift to the eleventh gear is permitted.

The same or similar criteria can also be used for initiating the traction downshift concerned prematurely, i.e. before the shifting speed concerned has been reached or exceeded, or even before the shift process taking place within the limiting gear progression $G_{Gr}(x_F)$, so that the initiation can take place immediately or after driving through a specified proportion of the travel stretch $Dx_{RS}$ determined.

The traction downshift can be initiated prematurely by replacing two control-relevant input values of the normal shift control system, namely the value of the current driver's wish and the value of the current driving resistance $F_{FW}(0)$, respectively by the full-load value (100%) of the driver's wish and by the value of the driving resistance at a travel point ahead of the motor vehicle or by the value of the driving resistance averaged over a road section ahead of the motor vehicle, in which the limiting gear $G_{Gr}$ of the limiting gear progression $G_{Gr}(x_F)$ is lower than the currently engaged gear $G_0$ ($G_{Gr}<G_0$).

In the diagrams a) to c) of FIG. 6 the motor vehicle, with the twelfth gear currently engaged ($G_0$=12), is approaching a hill with a brow whose peak is about $Dx_{BK}$=220 m away. Thus, the limiting gear progression $G_{Gr}(x_F)$ shown in part b) of FIG. 6 and the traction force variation $F_{Zug}(x_F)$ also pictured in part c) of FIG. 6 provide for three traction downshifts down to the ninth gear, and then two traction upshifts up to the eleventh gear.

However, since the ninth gear in the limiting gear progression $G_{Gr}(x_F)$ is maintained only over a road section of about $Dx_H$=70 m which is therefore shorter than the envisaged driving distance limit, in this case of $Dx_{H3}$=120 m, the last traction downshift is blocked well in time and thus the subsequent traction upshift is also avoided. Consequently, the actual gear progression and traction force variation in the area of the brow of the hill correspond to the variations denoted $G_{Gr}\mathcal{C}(x_F)$ and $F_{Zug}\mathcal{C}(x_F)$ in parts a) and b) of FIG. 6.

To block the traction downshift into the ninth gear, when the tenth gear is engaged and the evaluation of the driving resistance profile $F_{FW}(x_F)$ gives the result described earlier, the value of the then current driver's wish is replaced by a reduced value such as 80% and the value of the then current driving resistance is replaced by the value of the driving resistance at a travel point ahead of the motor vehicle or by a value of the driving resistance averaged over a road section ahead of the motor vehicle, in which the limiting gear $G_{Gr}$ of the limiting gear progression $G_{Gr}(x_F)$ corresponds to the then currently engaged gear $G_0$ and/or to a gear higher than it ($G_{Gr} \geq G_0$).

To make clear the significance of correctly timed traction downshifts, part a) and part c) of FIG. 6 also picture the development of the traction force $F_{Zug}*(x_F)$ and the engine speed $n_{Mot}*(x_F)$ of the drive engine for the case when the shifts provided for in the limiting gear progression $G_{Gr}(x_F)$, in particular the traction downshifts, are not carried out.

INDEXES $F_{FW}$ Driving resistance
$F_{FW}(0)$ Current driving resistance
$F_{Luft}$ Air resistance
$F_{Roll}$ Rolling resistance
$F_{Steig}$ Inclination resistance
$F_{Zug}$ Traction force
$F_{Zug'}$ Traction force (without downshift)
$F_{Zug}*$ Traction force (without downshifts)
G Gear
$G_0$ Currently engaged gear
$G_{Gr}$ Limiting gear
$G_{Gr}(0)$ Current limiting gear
$G_{Gr'}$ Limiting gear (without downshift)
i Gear ratio
$i_{FW}$ Driving resistance ratio
$i_{G\_Gr}$ Gear ratio of a limiting gear
$i_{TA}$ Gear ratio of the drive axle
$m_{Fzg}$ Mass of the vehicle
$M_{Mot}$ Drive engine torque
$n_{Gr1}$ Lower speed limit
$n_{Gr2}$ Lower speed limit
$n_{Mot}$ Engine speed
$n_{Mot}(0)$ Current engine speed
$r_{RA}$ Radius of the drive wheels
t Time
$v_F$ Driving speed
$v_{Soll}$ Nominal speed
$x_F$ Driving distance variable
$h_{TS}$ Efficiency of the drive-train
$Dt_{H1}$ Driving time limit with a higher limiting gear
$Dt_{H2}$ Driving time limit with a higher limiting gear
$Dt_{H3}$ Driving time limit with a lower limiting gear
$Dt_{H4}$ Driving time limit with a lower limiting gear
$Dt_{RS}$ Time interval until the downshift envisaged $Dt_{R1}$ Driving time limit until the downshift
$Dt_{R2}$ Driving time limit until the downshift
$Dx_{BK}$ Driving distance until the brow of a hill is reached
$Dx_{Ges}$ Total road section determined
$Dx_H$ Road section with a higher or lower limiting gear
$Dx_{H1}$ Driving distance limit with a higher limiting gear
$Dx_{H2}$ Driving distance limit with a higher limiting gear
$Dx_{H3}$ Driving distance limit with a lower limiting gear
$Dx_{H4}$ Driving distance limit with a lower limiting gear
$Dx_{RS}$ Driving distance until the downshift envisaged
$Dx_{R1}$ Driving distance limit until the downshift
$Dx_{R2}$ Driving distance limit until the downshift

The invention claimed is:

1. A method of controlling shifts in an automated multi-step variable-speed transmission, in a drive-train of a motor vehicle, arranged between a drive engine and an axle drive, the method comprising the steps of:
    determining, while driving, current operating parameters of the motor vehicle, including vehicle, road and driver-specific operating parameters, and topographical data including a height profile of a road section ahead of the motor vehicle;
    determining a driving resistance profile ($F_{FW}(x_F)$) of the motor vehicle for the road section ahead and from the current operating parameters operating parameters, and the topographical data including the height profile of the road section ahead;
    determining from the driving resistance profile ($F_{FW}(x_F)$) for the road section ahead and from operating parameters of the drive engine and the multi-step variable-speed transmission, a limiting gear progression ($G_{Gr}(x_F)$) which comprises a sequence of respective gears in which traction force of the drive engine acting on drive wheels of the motor vehicle is, in each case, larger than the driving resistance profile (($F_{FW}(x_F)$);
    deriving control commands, during traction operation of the multi-step variable-speed transmission in the automatic mode, for at least one of traction upshifts and traction downshifts as a function of the limiting gear progression ($_{Ggr}(x_F)$); and
    implementing the control commands, via a transmission control system, for the at least one of the traction upshifts and traction downshifts.

2. The method according to claim 1, further comprising the steps of
    calculating a variation of a driving resistance gear ratio ($i_{Fw}(x_F)$) from the driving resistance profile ($F_{FW}(x_F)$) for the road section ahead using the equation:

$$i_{FW}(x_F) = F_{FW}(x_F)/(M_{Mot} * i_{TA}/r_{RA} * h_{TS})$$

in which
    $x_F$ is a driving distance variable,
    $M_{MOT}$ is an engine torque, $i_{TA}$ is a gear ratio of the drive axle,
    $r_{RA}$ is a radius of the drive wheels, and
    $h_{TS}$ is an efficiency of the drive-train at which the traction force of the drive engine acting on the drive wheels of the motor vehicle corresponds, in each case, to the driving resistance ($F_{FW}(x_F)$; and
    determining from the variation of the driving resistance gear ratio ($i_{FW}(x_F)$), gears of the limiting gear progression ($G_{Gr}(x_F)$) as highest gears whose gear ratio ($i_{G\_Gr}$) is, in each case, higher than the driving resistance gear ratio (($i_{G\_FW}(x_F)$); ($i_{G\_Gr} > i_{FW}(x_F)$)).

3. The method according to claim 1, further comprising the step of communicating the control commands, for the at least one of the traction upshift and the traction downshift, in each case, to a shift control system of the multi-step variable-speed transmission by replacing at least one control-relevant value of a current operating parameter with a value that has been either determined or modified in a suitable manner.

4. The method according to claim 3, further comprising the step of influencing a shifting behavior, by replacing at least one of a value of a current driver's wish (power demand by the driver or by a cruise control) and a value of a current driving resistance ($F_{FW}(0)$), in each case, by the value that has been either determined or modified in a suitable manner.

5. The method according to claim 1, further comprising the step of permitting a traction upshift when a limiting gear ($G_{Gr}$) of the limiting gear progression $G_{Gr}(x_F)$, at a current position of the vehicle (t=0, $x_F$=0), is higher than a currently engaged gear ($G_0$) ($G_{Gr}(0) > G_0$) and no forthcoming gearshift to a gear lower than this limiting gear ($G_{Gr}$), in the limiting gear progression $G_{Gr}(x_F)$, is due to occur within either a specified driving time limit ($Dt_{H1}$) or a driving distance limit ($Dx_{H1}$).

6. The method according to claim 5, further comprising the step of maintaining control-relevant values of the current operating parameters to permit the at least one of the traction upshift and the traction downshift.

7. The method according to claim 6, further comprising the step of initiating a traction downshift, before the lapse of the specified proportion of the either time interval ($Dt_{RS}$) or the travel distance ($Dx_{RS}$), if the engine speed ($n_{Mot}$) of the drive engine by then either reaches or falls below a specified lower speed limit ($n_{Gr2}$).

8. The method according to claim 1, further comprising the step of permitting a traction downshift when a limiting gear ($G_{Gr}$) of the limiting gear progression ($G_{Gr}(x_F)$), at a current position of the vehicle (t=0, $x_F$=0), corresponds to a currently engaged gear ($G_0$) ($G_{Gr}(0) = G_0$), the limiting gear progression ($G_{Gr}(x_F)$) provides for a forthcoming traction downshift to a lower limiting gear ($G_{Gr} < G_0$) within either a specified driving time limit ($Dt_{R1}$) or a driving distance limit ($Dx_{R1}$), and no forthcoming gearshift to a gear higher than the limiting gear ($G_{Gr}$) in the limiting gear progression ($G_{Gr}(x_F)$) is due to occur within either another specified driving time limit ($Dt_{H3}$) or another driving distance limit ($Dx_{H3}$).

9. The method according to claim 1, further comprising the step of either blocking or delaying a traction upshift if a limiting gear ($G_{Gr}$) of the limiting gear progression $G_{Gr}(x_F)$, at a current position of the vehicle (t=0, $x_F$=0), is higher than a currently engaged gear ($G_0$) ($G_{Gr}(0) > G_0$), but a gearshift to a gear lower than the limiting gear ($G_{Gr}$) in the limiting gear progression ($G_{Gr}(x_F)$) is due to occur again within either a specified driving time limit ($Dt_{H1}$) or a driving distance limit ($Dx_{H1}$).

10. The method according to claim 9, further comprising the steps of, for the blocking or the delaying the traction upshift, replacing a value of a current driver's wish by a full-load value (100%) and replacing a value of t a current driving resistance ($F_{FW}(0)$) by either a value of the driving resistance at a travel point ahead of the motor vehicle or a value of the driving resistance averaged over the road section ahead of the motor vehicle, in which the limiting gear ($G_{Gr}$) of the limiting gear progression ($G_{Gr}(x_F)$) corresponds to the currently engaged gear ($G_0$) ($G_{Gr}(0) = G_0$).

11. The method according to claim 1, further comprising the step of prematurely initiating a traction upshift when a limiting gear ($G_{Gr}$), of the limiting gear progression ($G_{Gr}(x_F)$) at a current position of the vehicle (t=0, $x_F$=0), is at least two gear steps higher than a currently engaged gear ($G_0$) ($G_{Gr}(0) \geq G_0 + 2$), and no gearshift to a gear lower than the limiting gear ($G_{Gr}$), in the limiting gear progression ($G_{Gr}(x_F)$), is due to occur during a portion of the road section ahead ($Dx_{Ges}$).

12. The method according to claim 11, further comprising the step of, for the premature initiation of a traction upshift, replacing a value of a current driver's wish by a part-load value (such as 45%) and replacing a value of current driving resistance ($F_{FW}(0)$) either by a value of driving resistance, at a travel point ahead of the motor vehicle, or by a value of driving resistance averaged over a road section ahead of the motor vehicle, in which the limiting gear ($G_{Gr}$) of the limiting gear progression ($G_{Gr}(x_F)$) is either two steps higher, or one step higher than the currently engaged gear ($G_0$) ($G_{Gr}=G_0+2$; $G_{Gr}=G_0+1$).

13. The method according to claim 11, further comprising the step of only prematurely initiating a traction upshift during a cruise control operation, and only permitting the traction upshift if a nominal speed ($v_{Soll}$) has previously already been reached and a current speed is below the nominal speed ($v_F(0)<v_{Soll}$).

14. The method according to claim 1, further comprising the step of prematurely initiating a traction upshift when a limiting gear ($G_{Gr}$), of the limiting gear progression ($G_{Gr}(x_F)$) at a current position of the vehicle ($t=0, x_F=0$), is at least one step higher than a currently engaged gear ($G_0$) ($G_{Gr}(0) \geq G_0+1$), and no gearshift to a gear lower than the limiting gear ($G_{Gr}$), in the limiting gear progression ($G_{Gr}(x_F)$), is due to occur within either a specified driving time limit ($Dt_{H2}$) or a driving distance limit ($Dx_{H2}$).

15. The method according to claim 1, further comprising the step of, for a premature initiation and either a blocking or a delay of a traction downshift, additionally predicting and evaluating at least a variation of engine speed ($n_{Mot}*(x_F)$) of the drive engine, in the currently engaged gear ($G_0$), starting from a current engine speed ($n_{Mot}(0)$) with reference to a driving resistance variation ($F_{FW}(x_F)$).

16. The method according to claim 1, further comprising the step of either blocking or delaying a traction downshift when at least one of a limiting gear ($G_{Gr}$), of the limiting gear progression ($G_{Gr}(x_F)$) at a current position of the vehicle ($t=0, x_F=0$), corresponds to a currently engaged gear ($G_0$) ($G_{Gr}(0)=G_0$), the limiting gear progression ($G_{Gr}(x_F)$) providing for a forthcoming traction downshift to a lower limiting gear ($G_{Gr}<G_0$) within either a specified driving time limit ($Dt_{R1}$) or driving distance limit ($Dx_{R1}$), but a gearshift is due to occur again to a gear higher than the limiting gear ($G_{Gr}$) in the limiting gear progression ($G_{Gr}(x_F)$) within the specified driving time limit ($Dt_{H3}$) or the driving distance limit ($Dx_{H3}$), and when a predicted variation of engine speed ($n_{Mot}*(x_F)$) does not fall below a specified lower speed limit ($n_{Gr1}$) within either the specified driving time limit ($Dt_{H3}$) or the driving distance limit ($Dx_{H3}$).

17. The method according to claim 16, further comprising the step of, for either the blocking or the delay of a traction downshift, replacing a value of a current driver's wish by a reduced value (such as 80%) and replacing a value of a current driving resistance ($F_{FW}(0)$) by either a value of driving resistance at a travel point ahead of the motor vehicle or by a value of driving resistance averaged over the road section ahead of the motor vehicle, in which the limiting gear ($G_{Gr}$) of the limiting gear progression ($G_{Gr}(x_F)$) corresponds to at least one of the currently engaged gear ($G_0$) and a higher gear ($G_{Gr} \geq G_0$).

18. The method according to claim 1, further comprising the step of prematurely initiating a traction downshift at least one of when a limiting gear ($G_{Gr}$), of the limiting gear progression ($G_{Gr}(x_F)$) at a current position of the vehicle ($t=0, x_F=0$), corresponds to a currently engaged gear ($G_0$) ($G_{Gr}(0)=G_0$), the limiting gear progression ($G_{Gr}(x_F)$) provides for a forthcoming traction downshift to a lower limiting gear ($G_{Gr}<G_0$) within either a specified driving time limit ($Dt_{R2}$) or a driving distance limit ($Dx_{R2}$), and no gearshift to a gear higher than the limiting gear ($G_{Gr}$), in the limiting gear progression ($G_{Gr}(x_F)$), is due to occur within the specified driving time limit ($Dt_{H4}$) or the driving distance limit ($Dx_{H4}$), and when a predicted variation of engine speed ($n_{Mot}*(x_F)$) falls below a specified lower speed limit ($n_{Gr1}$) within the specified driving time limit ($Dt_{H4}$) or the driving distance limit ($Dx_{H4}$).

19. The method according to claim 18, further comprising the step of, for the premature initiation of the traction downshift, determining either a time interval ($Dt_{RS}$) or a travel distance ($Dx_{RS}$) until the downshift within the limiting gear progression ($G_{Gr}(x_F)$), and the traction downshift is initiated after the lapse of a specified proportion of either the time interval ($Dt_{RS}$) or the travel distance ($Dx_{RS}$).

20. The method according to claim 18, further comprising the step of, for the premature initiation of a traction downshift, replacing a value of a current driver's wish by a full-load value (100%) and replacing a value of a current driving resistance ($F_{FW}(0)$) either by a value of driving resistance at a travel point ahead of the motor vehicle or by a value of driving resistance averaged over the road section ahead of the motor vehicle, in which the limiting gear ($G_{Gr}$) of the limiting gear progression $G_{Gr}(x_F)$ is lower than the currently engaged gear ($G_0$) ($G_{Gr}<G_0$).

* * * * *